(12) United States Patent
Blagodurov et al.

(10) Patent No.: US 9,594,521 B2
(45) Date of Patent: Mar. 14, 2017

(54) SCHEDULING OF DATA MIGRATION (71) Applicant: Advanced Micro Devices, Inc., Sunnyvale, CA (US)

(72) Inventors: Sergey Blagodurov, Bellevue, WA (US); Andrew G. Kegel, Bellevue, WA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 0 days.

(21) Appl. No.: 14/629,014

(22) Filed: Feb. 23, 2015

(65) Prior Publication Data

US 2016/0246540 A1    Aug. 25, 2016

(51) Int. Cl.
*G06F 3/06*     (2006.01)
*G06F 12/02*    (2006.01)

(52) U.S. Cl.
CPC ............ *G06F 3/0647* (2013.01); *G06F 3/065* (2013.01); *G06F 3/067* (2013.01); *G06F 3/0607* (2013.01); *G06F 3/0619* (2013.01); *G06F 3/0659* (2013.01); *G06F 12/0215* (2013.01); *G06F 2212/654* (2013.01)

(58) Field of Classification Search
CPC .... G06F 3/0607; G06F 3/0619; G06F 3/0647; G06F 3/065; G06F 3/0659; G06F 3/067; G06F 12/0215; G06F 2212/654
See application file for complete search history.

(56) References Cited

U.S. PATENT DOCUMENTS

| 6,952,821 B2* | 10/2005 | Schreiber | 711/165 |
| 7,155,572 B2 | 12/2006 | Hughes et al. | |
| 2006/0112228 A1* | 5/2006 | Shen | G06F 12/084 711/133 |
| 2008/0307178 A1* | 12/2008 | Agombar | G06F 3/0605 711/162 |

OTHER PUBLICATIONS

Nadav Amit et al., "IOMMU: Strategies for Mitigating the IOTLB Bottleneck," Proceedings of the 2010 International Conference on Computer Architecture, Jun. 19, 2010, 12 pages.
Tomasz Stanislawski, "Page Migration for IOMMU Enhanced Devices," Aug. 20, 2013, 36 pages.
Advanced Micro Devices, Inc., "AMD I/O Virtualization Technology (IOMMU) Specification License Agreement," PID 48882 Rev 2.00, Mar. 24, 2011, 167 pages.

* cited by examiner

*Primary Examiner* — Aracelis Ruiz
(74) *Attorney, Agent, or Firm* — Polansky & Associates, P.L.L.C.; Paul J. Polansky (57) ABSTRACT In one form, scheduling data migration comprises determining whether the data is likely to be used by an input/output (I/O) device, the data being at a location remote to the I/O device; and scheduling the data for migration from the remote location to a location local to the I/O device in response to determining that the data is likely to be used by the I/O device.

14 Claims, 4 Drawing Sheets

SCHEDULING OF DATA MIGRATION

FIELD

This disclosure relates generally to data processing systems, and more specifically to scheduling of data migration in data processing systems.

BACKGROUND

With the advent of ubiquitous information gathering and producing mobile devices such as digital cameras, smart phones, tablets etc., the world has been experiencing an explosion in the amount of data being gathered. To process this huge amount of data (also known as Big Data), massively parallel software programs running on tens, hundreds, or even thousands of servers (also known as Big Compute) are being used. Due to this new Big Data and Big Compute paradigm, it is no longer enough to deliver relevant data to where processing is to occur, the data has to also be processed quickly in order to retain any business value.

One method that has been used to tackle this ever-increasing demand for data processing has been to rethink the traditional way of designing computing systems. For example, instead of having central processing units (CPUs) primarily process data, various other processing devices located throughout a computing system have been configured to process data. This configuration has led to a decrease in data transfer overhead as well as to a reduction in latency.

Further, computing systems have been designed based on a heterogeneous system architecture (HSA). HSA is a computer architecture that integrates CPUs and graphics processor units (GPUs) onto a single chip called an accelerated processing unit (APU). CPUs and GPUs in an APU use a common bus and share tasks and system memory. To facilitate the sharing of tasks between the integrated CPUs and GPUs, a unified memory address space is used. The unified memory address space is supported by specified memory management units (MMUs). The MMUs provide virtual to physical memory address translations as well as protection functionalities for the integrated CPUs and GPUs.

To provide virtual to physical memory address translations as well as protection functionalities to input/output (I/O) devices and/or the various other processing devices located throughout the computing system, input/output memory management units (IOMMUs) are used. Just as in the case of the MMUs, the IOMMUs also support the unified memory address space.

In certain computing environments, two or more HSA systems may be combined together to provide more computing power. In such cases, different system memories may be local to different HSA systems. Consequently, the time needed for a device (e.g., an I/O device or one of the various other processing devices located throughout the computing system) to perform a memory access is dependent on the location of the memory system relative to the device. One of HSA's aims, however, is to reduce communication latency between CPUs, GPUs and the various other processing elements that are located throughout the computing system (note that CPUs, GPUs and the various other processing elements may generally be referred to as compute devices), and to make the compute devices more compatible to each other from a programmer's perspective.

One method of reducing communication latency between the compute devices is to ensure that data that is needed by a compute device is loaded into a memory system that is local to the HSA system to which the compute device is attached. Hence, in cases where the data is in a remote memory system, the data may have to be migrated to a local memory system to reduce latency.

However, in order for the compute devices to be compatible to each other from a programmer's perspective, the programmer should not have to plan to move data from one memory system to another.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

The present disclosure provides a method of dynamically scheduling memory page migration in a computing system. The method determines whether data is likely to be used by an input/output (I/O) device. In response to determining that the data is likely to be used by the I/O device and if the data is at a location remote to the I/O device, then the data may be scheduled for migration from the remote location to a location local to the I/O device.

Figure 1:
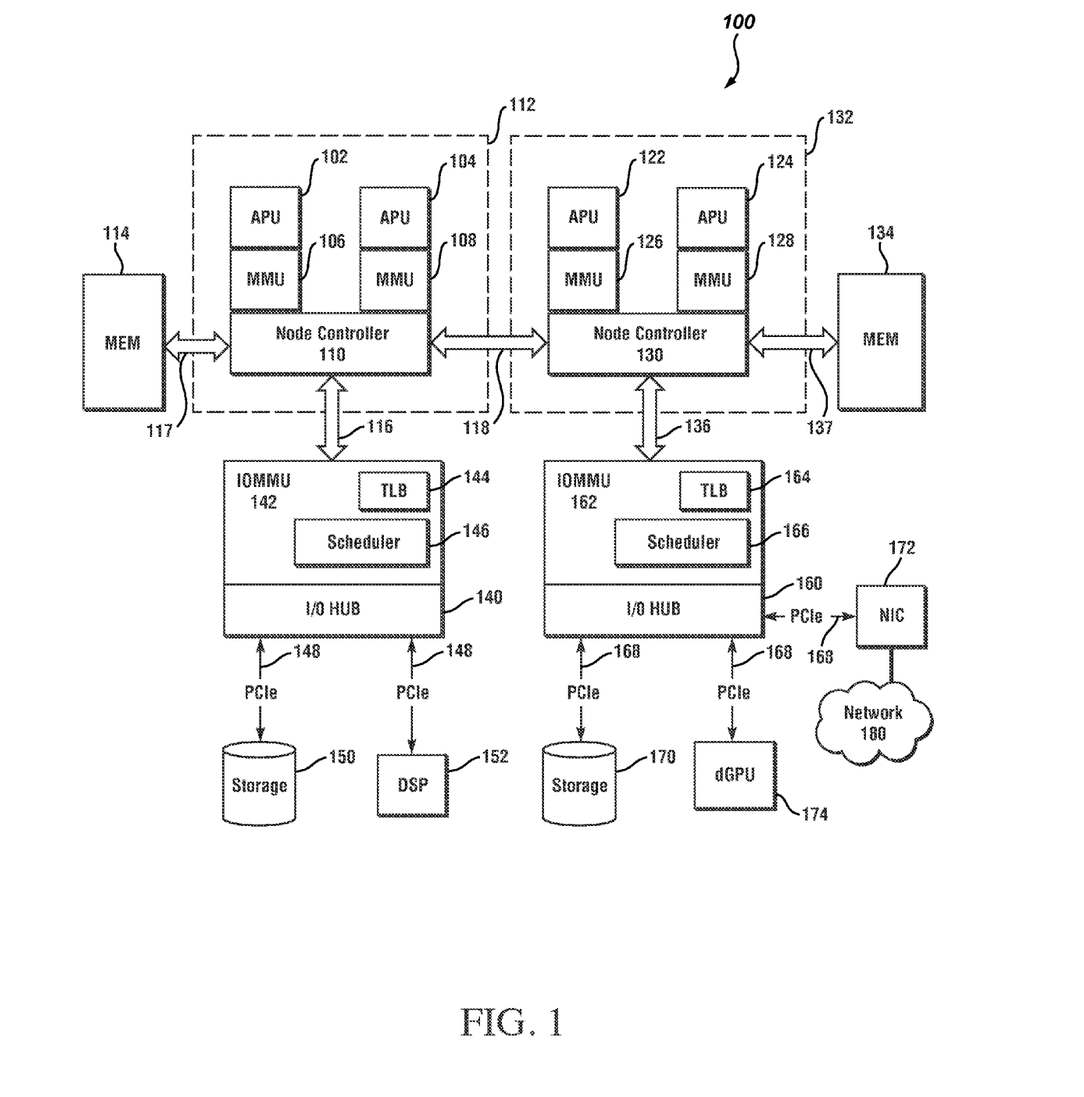
FIG. 1 depicts a block diagram of a server using input/output memory management units (IOMMUs).

With reference now to the figures, FIG. 1 depicts a block diagram of a server 100 using input/output memory management units (IOMMUs). The server 100 is implemented using a plurality of accelerated processing units (APUs). An APU, such as APU 200 in FIG. 2, may include one or more central processing unit (CPU) cores 210 and one or more graphic processing unit (GPU) cores 220. The one or more CPU cores 210 are used to process data that is best processed in series while the one or more GPU cores 220 are used to process data that is to be processed in parallel. Both the one or more CPU cores 210 and GPU cores 220 are connected to a high performance crossbar and memory controller 240. The high performance crossbar and memory controller 240 may be connected to an off-chip system memory (not shown) via a memory interface 250. The high performance crossbar and memory controller 240 may also be connected to platform interfaces 230. Platform interfaces 230 provide an interface through which other devices in a computer system may be attached to the APU 200.

Figure 2:
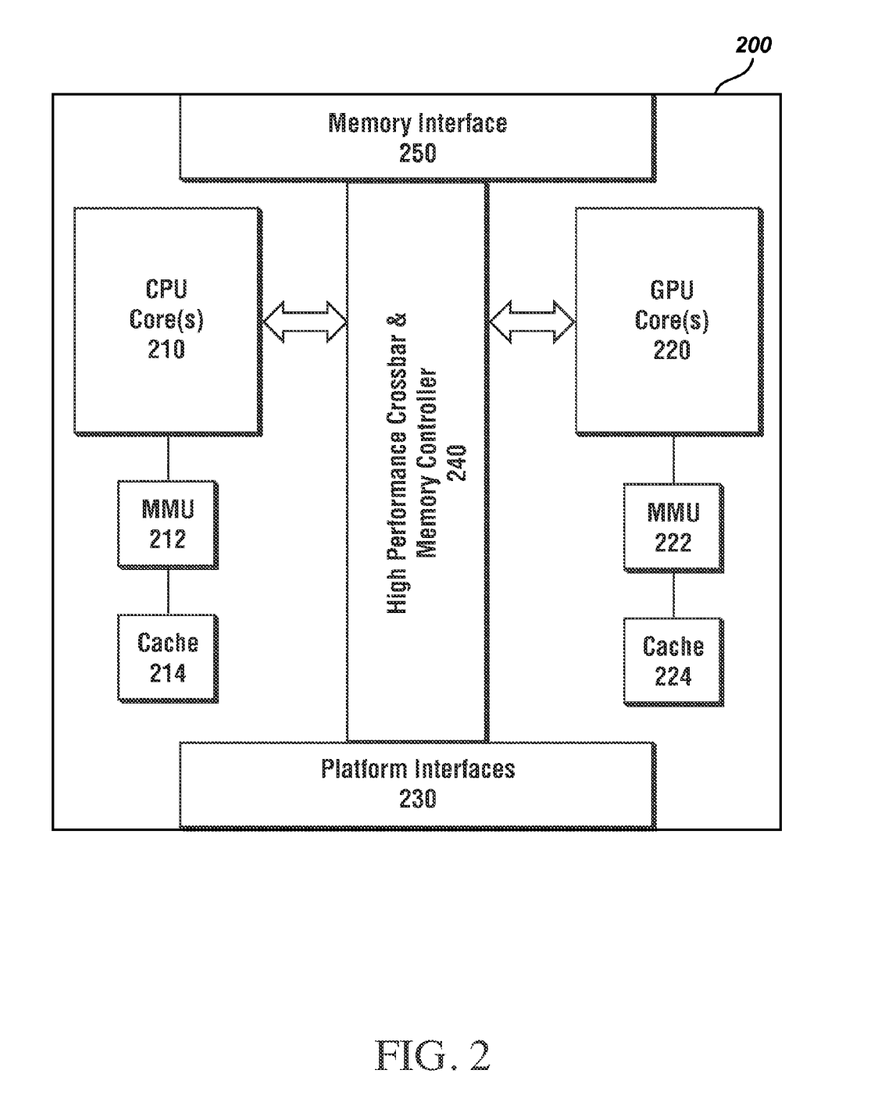
FIG. 2 illustrates a block diagram representation of an accelerated processing unit (APU) used in the server of FIG. 1.

The one or more CPU cores 210 are connected to at least one memory management unit (MMU) 212 and to at least one cache system 214. Likewise, the one or more GPU cores 220 are connected to at least one MMU 222 and to at least one cache system 224. The MMUs 212 and 222 provide virtual to physical memory address translations as well as protection functionalities for the one or more CPU cores 210 and GPU cores 220, respectively. Both the MMUs 212 and 222 support a unified memory address space allowing for the integration of the one or more CPU cores 210 and GPU cores 220 into one processing chip in accordance with a heterogeneous system architecture (HSA).

Returning to FIG. 1, the server 100 includes APUs 102, 104, 122 and 124. APUs 102 and 104 may share an off-chip memory device 114 through link 117. Likewise, APUs 122 and 124 may share an off-chip memory device 134 through link 137. Memory devices 114 and 134 may include dynamic random access memory (DRAM) devices, non-volatile RAM (NVRAM) devices, or any other memory device that may be used as system memory or a combination thereof.

For clarity purposes, each APU is shown connected to an MMU (see APUs 102, 104, 122 and 124 connected to MMUs 106, 108, 126 and 128, respectively). In actuality, each of MMUs 106, 108, 126 and 128 may be located within the respective APU to which it is connected and represents both MMUs 212 and 222 of FIG. 2.

APUs 102 and 104 form a non-uniform memory access (NUMA) node 112 and APUs 122 and 124 form a NUMA node 132. NUMA is a method of configuring a cluster of processors in a multiprocessing system such that the processors may share memory locally, thereby improving performance. The APUs in NUMA node 112 and those in NUMA node 132 share memory devices 114 and 134 over link 118.

Attached to APUs 102 and 104, over link 116, is an I/O hub 140. Likewise, attached to APUs 122 and 124 over link 136 is an I/O hub 160. Through I/O hubs 140 and 160, various peripheral or I/O devices may be connected to the server 100. For example, storage device 150, which may include hard drives, NVRAMs, flash drives etc., and digital signal processing (DSP) module 152 may be attached to the server 100 through I/O hub 140 via a peripheral component interconnect express (PCIe) bus 148. Likewise, storage device 170, network interface card (NIC) 172 and discrete GPU (dGPU) 174 may be added to the server 100 through I/O hub 160 via PCIe bus 168. Note that henceforth, the terms "I/O device" and "peripheral device" will be used interchangeably.

The storage devices 150 and 170 may contain user data, at least one operating system (OS), a hypervisor in cases where the server 100 is logically partitioned, as well as software applications that may be needed by the server 100 to perform any particular task. In operation, the OS, hypervisor, firmware applications and the software application needed by the server 100 to perform a task may all be loaded into either memory device 114 or 134 or partly into both memory devices 114 and 134.

The server 100 may interact with other computing systems via NIC 172 over network 180. Network 180 may include connections, such as wire, wireless communication links, fiber optic cables, etc. Further, network 180 may include the Internet or may be implemented as a number of different types of networks, such as for example, an intranet, a local area network (LAN), a wide area network (WAN), a cellular phone network etc.

DSP module 152 is used to measure, filter and/or compress continuous real-world analog signals. Real-world analog signals may include audio signals, video signals, radio signals etc. The real-world analog signals may be obtained through a microphone (not shown), a camera (not shown) radio or television antennae (not shown) etc. attached to the server 100 or received from another computing system through NIC 172. The first step that may be performed by DSP module 152 is to convert the signals from an analog to a digital form, by sampling and then digitizing the signals using an analog-to-digital converter (ADC) if the signals are not already in a digital form. The second step is to process the digitized signals.

A dGPU, such as dGPU 174, is a specialized circuit designed to rapidly manipulate and alter memory in such a way so as to accelerate the building of images in a frame buffer intended for output to a display device (not shown).

Each I/O hub includes an IOMMU (see IOMMUs 142 and 162). An IOMMU is a system function that translates addresses used in direct memory access (DMA) transactions, disallow memory accesses to peripheral devices with improper access permissions, and remaps peripheral interrupts. As in the case of MMUs 212 and 222 of FIG. 2, IOMMUs 142 and 162 support the unified memory address space in accordance with the HSA specification.

IOMMU 142 performs address translations on behalf of I/O devices connected to the I/O hub 140 while IOMMU 162 performs address translations on behalf of I/O devices connected to I/O hub 160. The IOMMUs 142 and 162 are allowed to cache page table and device table contents in translation lookaside buffers or TLBs (see TLBs 144 and 164) to speed up future address translation processes.

Figure 3:
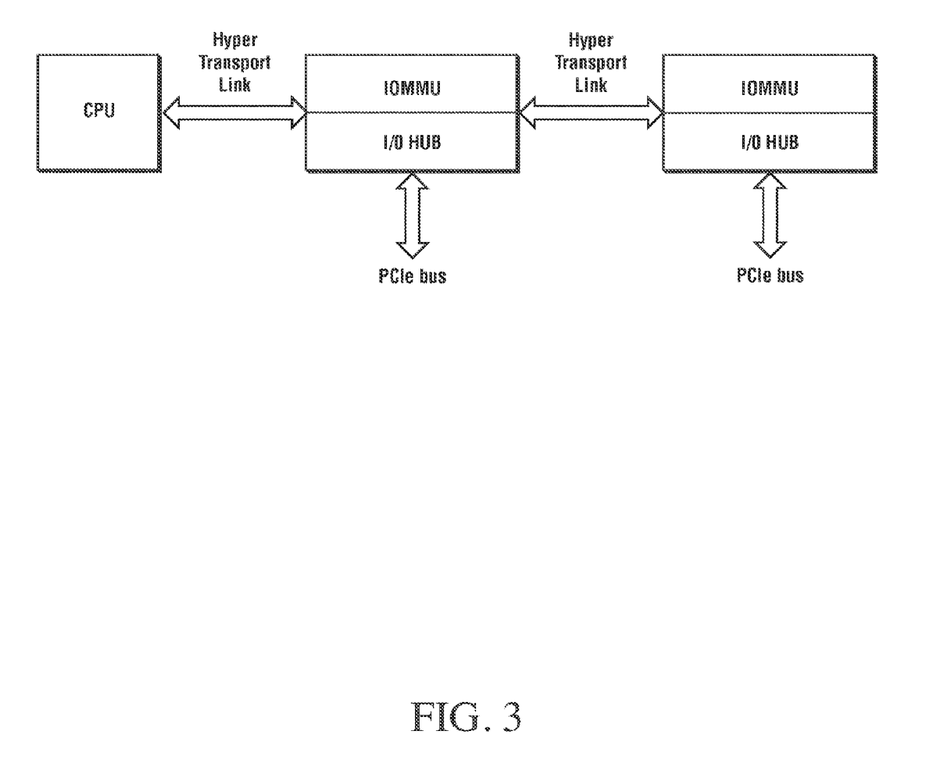
FIG. 3 illustrates a block diagram of a system having concatenated IOMMUs.

Note that the depicted example in FIG. 1 is not meant to imply architectural limitations. For instance, various other devices may be attached to server 100 via I/O hubs 140 and 160. The devices may include, but are not limited to, accelerated processing devices (APDs), expansion cards, peripheral cards, NICs with extensive off-load capabilities, wide area network (WAN) interface cards, voice interface cards, network monitoring cards etc. Further, in this particular example, the IOMMUs are implemented as a HyperTransport™ tunnel. HyperTransport™ is a trademark of the HyperTransport™ Industry Consortium. The HyperTransport™ tunnel defines only five (5) bits of UnitID information to identify originators of requests. Thus, IOMMUs 142 and 162 can provide distinct translations for at most thirty-one (31) downstream devices. In cases where there are more than thirty-one (31) downstream devices from an IOMMU, two IOMMUs may be concatenated together, as shown in FIG. 3, to provide support for the additional devices. FIG. 3 illustrates a block diagram of a system having concatenated IOMMUs.

In operation, the I/O devices attached to the server 100 may access data loaded in memory pages in either memory device 114 or 134. As an example, NIC 172 may access data loaded in memory devices 114 and 134. To access data stored in a memory device, NIC 172 issues a request that includes a device address (i.e., a virtual address). The request goes to IOMMU 162 where the device address is translated into a corresponding physical memory address and stored into TLB 164 if there is not already an entry in TLB 164 corresponding to the device address. If there is an entry in TLB 164 corresponding to the device address, the entry is used to obtain the corresponding physical memory address. If, based on the physical memory address, the data is in memory device 114, the request, along with the physical memory address, will go from IOMMU 162 to node controller 130 and node controller 110 before arriving at memory device 114. By contrast, if the data is in memory device 134, the request will go from IOMMU 162 to only node controller 130 before arriving at memory device 134. Thus, NIC 172 may access data in memory device 134 faster than data in memory device 114. Therefore, moving data that is to be accessed by NIC 172 from memory device 114 to memory device 134 may reduce latency and data overhead associated with the data access.

Page Migration for IOMMU Enhanced Devices by Tomsz Stanislawski, dated Aug. 20, 2013, provides a method by which files are migrated from one memory device to another. According to the reference, every mapping in a TLB includes a radix tree to track different parts of a file that are already in RAM (memory). Using the radix tree, a determination may be made as to the location of (i.e., which memory system contains) the different parts of the file as well as to whether to migrate the different parts of the file from one memory device to another. Based on the location, some or all the parts of the file may be moved from one memory system to another.

Likewise, each entry in TLBs 144 and 164 contains a radix tree that may be used by the IOMMUs 142 and 162, respectively, to determine the memory device in which memory pages containing a file are located. Based on the location of the memory pages, the pages may be moved from one memory system to another.

However, not all memory pages should be moved. For example, certain regions in system memory are reserved for memory-based queues for exchanging commands and status information between an IOMMU and an APU. Consequently, memory pages in these regions of memory should not be moved.

In addition, in order to perform permission checks, interrupt remapping, and address translation for a memory access requestor, an IOMMU uses three tables. These three tables are shared by both MMUs and IOMMUs of a system. Because the MMUs also use these tables, memory pages containing the tables should not be moved.

Further, memory pages containing log files should preferably not be moved as doing so may result in a loss of data. For example, according to IOMMU Architectural Specification, Rev. 2.0, published by Advanced Micro Devices (AMD) on Mar. 24, 2011, an IOMMU may detect and report several kinds of events that may arise due to unusual hardware or software behavior. When the IOMMU detects an event of any kind and event logging is enabled, the IOMMU writes an appropriate event entry into an event log located in system memory. Events detected by the IOMMU include I/O page faults as well as hardware memory errors detected when walking I/O page tables. The IOMMU can also optionally write to peripheral page service request queues and to guest virtual advanced programmable interrupt controller (APIC) logs in system memory. Moving log locations in system memory can introduce errors and finish unsuccessfully. When memory errors prevent recording of information in the in-system memory event log, critical events are reported in the hardware error registers. The hardware error registers can quickly fill up and overflow in such cases. This then may result in a loss of event information. Consequently, moving log files, while generally allowable, is not recommended due to the possibility of information loss.

All other memory pages may be moved if doing so may reduce data transfer overhead and latency. According to the present disclosure, a scheduler of a servicing IOMMU (see schedulers 146 and 166 of IOMMUs 142 and 162, respectively) may schedule memory pages for migration when applicable.

In order to schedule a memory page for migration, however, the page has to first be identified as a page that an I/O device attached to a servicing IOMMU may soon want to access. Below, three methods are disclosed that may be used to identify pages that an I/O device may soon want to access and thus may be scheduled for migration. Note that, although only three methods are disclosed, the present disclosure is not limited to only those three methods. For example, more or less than three methods may be used. Further, methods that are different from the ones disclosed may be used. Thus, the three methods are only used for illustration purposes.

A first method that may be used to identify pages that an I/O device may soon want to access is to use translation tables used by a servicing IOMMU. A first example of the first method includes using the peripheral page service request (PPR) logging (Section 3.5 of the IOMMU Architectural Specification) feature of the IOMMU. When an I/O device needs memory page services, the I/O device issues a special bus request to the IOMMU. If supported, the IOMMU converts the special bus request to a PAGE_SERVICE_REQUEST format. When the peripheral page service is enabled for the device, the IOMMU creates a PAGE_SERVICE_REQUEST entry in the PPR log buffer. PAGE_SERVICE_REQUEST PPR Log Buffer Entry format outlined in Table 67 of the IOMMU Architectural Specification contains the device virtual address of the page that the device was attempting to access. The virtual address or its correspondent physical memory address may be used to identify the page that may be scheduled for migration.

A second example of the first method includes using the Event Logging feature of the IOMMU. According to Section 3.4 of the IOMMU Architectural Specification, an IOMMU reports events to a host software by means of a shared circular buffer in system memory. Although this type of logging primarily reports errors related to page faults (see Table 45: IO_PAGE_FAULT Event Types, for a translation, the IOMMU returns response with data and no event log entry is created), it is still useful for determining a memory range of interest to the peripheral device, because Table 56: IO_PAGE_FAULT Event Log Buffer Entry Fields contains the address field which has the device virtual address that the peripheral device was attempting to access. The virtual address or its correspondent physical memory address in Table 56 may be used to identify the page that may be scheduled for migration.

A third example of the first method is to use ill-formed PCIe page request interface (PRI) requests. Certain types of ill-formed PCIe PRI requests are logged in the PPR request log with RZ=1 so that system software may attempt recovery (e.g., reserved bit error in FIG. 38 of the IOMMU Architectural Specification). When the peripheral page service is not enabled, the IOMMU creates an entry in the IOMMU event log to report the error (see Section 3.4.9 [INVALID_PPR_REQUEST Event]). The address in the event log entry may be used to identify the page that may be scheduled for migration.

A fourth example of the first method includes using the performance counter monitoring feature of the IOMMU. MMIO Offset [40-7F][0-F]00h IOMMU Counter Register counts events as programmed by IOMMU Counter Source Register [MMIO Offset [40-7F] [0-F]08h] and IOMMU PASID Match Register [MMIO Offset [40-7F][0-F]10h]. The value of this register may be used to determine the most memory-bound peripheral devices for which memory scheduling is worthwhile. In one embodiment, that can be done by setting the event counter source to type "5" from Table 71 of the IOMMU Architectural Specification, which corresponds to total peripheral memory operations translated. In this case, the page addresses that are accessed the most by these I/O devices may be scheduled for migration.

A fifth example of the first method includes using the device specific monitoring feature of the IOMMU. I/O translation buffer (IOTLB) on a peripheral device works in concert with an IOMMU. An I/O device with IOTLB support can cooperate with the IOMMU to maintain the I/O device's own cache of address translations. IOTLB-capable I/O devices contain private TLBs tailored for the devices own needs, creating a scalable distributed system of TLBs. Software can configure where the address translation is cached. For example, the address translation may be cached at the IOTLBs of the devices and/or at the IOMMU TLBs. The hardware allows for "exclusive" (IOMMU doesn't cache, but does walk tables) or "inclusive" (IOMMU caches). Even in the "inclusive" case, the IOMMU and IOTLB can have different ejection rules. Thus, the inclusivity is not strict and is completely unenforced. Depending on the capabilities of a particular device, certain logging and performance counter options may be made available, which can help identifying relevant memory pages that may be scheduled for migration.

A second method that may be used to identify pages that an I/O device may soon want to access and thus may be scheduled for migration is to take advantage of certain address translation "hint" commands. According to the IOMMU specification, special "hint" commands may be issued by peripheral devices in an attempt to preemptively load/clear address translation information. These commands can be injected into the IOMMU command queue. They can further give schedulers the addresses of pages to be migrated closer to an IOMMU (in anticipation of their later use) or away from near-IOMMU's congested memory (once the pages are no longer needed).

The "hint" commands may include a PREFETCH_IOMMU_PAGES command. This command is a hint to the IOMMU that the associated translation records will be needed relatively soon and that the IOMMU should execute a page table walk to fetch and store the translation information into the IOMMU's TLBs. If an entry is already in a TLB, the IOMMU may adjust a least recently used (LRU) algorithm or other control tags to lengthen cache residency. The addresses in the translation information may be used to identify the pages that should be scheduled for migration.

Another "hint" command may include INVALIDATE_IOTLB_PAGES. A software module may issue an INVALIDATE_IOTLB_PAGES command to cause the IOMMU to generate an invalidation request to a peripheral device (see Section 3.3.4 [INVALIDATE_IOTLB_PAGES] of the IOMMU Architectural Specification) in order for the device to invalidate the relevant cached translation entry. These requests are usually issued by system software after updating a table entry that can be cached, so the peripheral device IOTLBs can also be invalidated (see Section 3.2.1 of the IOMMU Architectural Specification). The addresses in the cached translation entry may be used to identify the pages that are to be scheduled for migration.

A third method that may be used to identify pages that an I/O device may soon want to access and thus may be scheduled for migration is to use explicit software assistance in memory scheduling. For instance, a software module may include code for utilizing a particular peripheral device. While using the peripheral device, the software module has to share the virtual memory maintenance with an IOMMU. At the time of executing the maintenance functions, the software can optionally notify the memory scheduler of the upcoming memory accesses, or perform the page migration using common NUMA API.

One example of the third method includes using "accessed" and "dirty" bits. The IOMMU typically sets the "accessed" and "dirty" bits of the memory pages in a single locked operation. However, the IOMMU never clears the "accessed" or "dirty" bits. The software module is responsible to do so. Because the IOMMU is allowed to cache these bits, the software must explicitly issue invalidation commands when clearing the bits in page table entry (PTE). According to Section 3.2.7.5 of the IOMMU Architectural Specification, to clear an accessed bit in a descriptor, the software module must modify the PTE in memory and then invalidate the page table entry in the IOMMU for all devices using the translation table as is outlined in the pseudo-code in Section 6.2 [Clear Accessed Bit] of the IOMMU Architectural Specification. Thus, the pages containing the PTE may be scheduled for migration as the software module will soon have to access those pages to modify the PTE.

Another example of the third method includes using application programs that can explicitly migrate memory pages to a relevant IOMMU. Specifically, an application program can explicitly migrate memory pages to a relevant IOMMU if the working memory set required by a peripheral device is limited. This is unique to near-IOMMU memory scheduling, as opposed to the general MMU memory scheduling on a NUMA system. This is because MMUs service compute cores that are often homogeneous or do not differ significantly. Thus, the application can be executed on any core. IOMMUs, on the other hand, service significantly different devices (e.g. a network card, an audio module and an APU). Because of this heterogeneity, system software can find out upfront what peripheral device will service the request. Based on the location of the peripheral device and using system tools, the location of the memory can be easily obtained. Depending on the location of the peripheral device, the memory pages may be scheduled for migration.

Note that scheduling a memory page for migration entails maintaining the address of the page in a TLB. Maintaining an inordinate number of page addresses in a TLB may result in TLB "thrashing". TLB "thrashing" occurs when there is insufficient locality of reference (i.e., due to a lack of space in the TLB, previous address translations are not effectively held within the TLB because the IOMMU constantly replaces previous address translations with newer ones). "IOMMU: Strategies for Mitigating the IOTLB Bottleneck" by Amit Nadav et al., *Proceedings of the* 2010 *International Conference on Computer Architecture*, ISCA'10, Berlin, Heidelberg, (2012), pages 256-274 (2010), the disclosure of which is herein incorporated by reference, proposes a method by which both system software and hardware enhancements are used to reduce input/output translation lookaside buffer (IOTLB) miss rate and accelerate address resolution. This method may be used to prevent TLB "thrashing" in accordance with the present disclosure.

Thus, a system as disclosed herein uses profiling of memory accesses from peripheral devices to dynamically schedule migration of data to those memory devices that are aligned with an IOMMU that services a memory access requestor. Having the data closer to the servicing IOMMU, and thus to the requestor, decreases the time between data delivery to processing units and subsequent analysis of the data, as well as reduces the load on on-chip systems.

Figure 4:
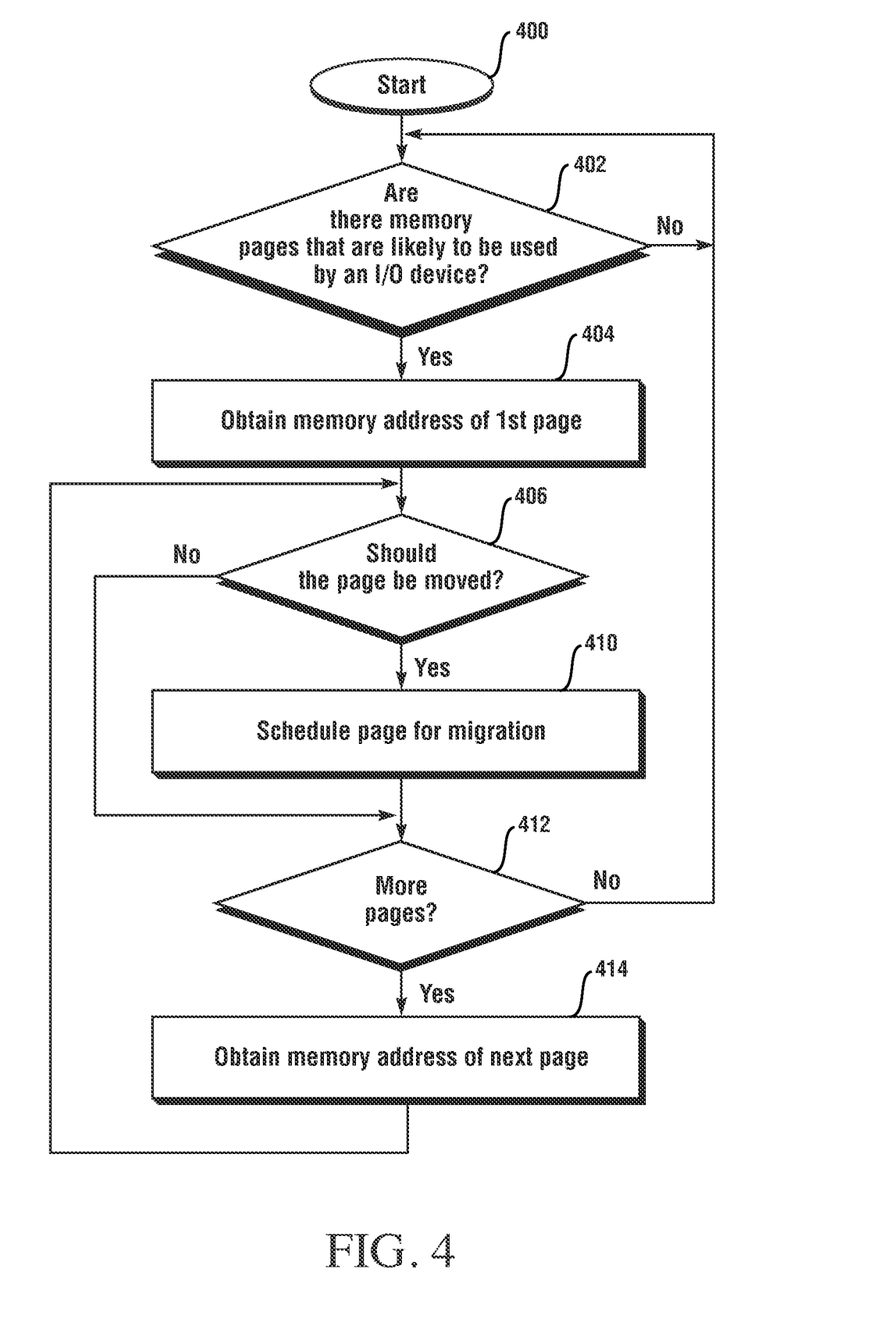
FIG. 4 depicts a flow diagram of a process that may be used to schedule memory pages for migration in the server of FIG. 1 according to some embodiments.

FIG. 4 depicts a flow diagram of a process that may be used to schedule memory pages for migration in the server of FIG. 1 according to some embodiments. The process is used by a scheduler (i.e., schedulers 146 and 166) to schedule data for migration. The process starts at box 400 when the server 100 is turned on or rebooted. Upon the server 100 being up and running, a scheduler of a servicing IOMMU determines at decision box 402 whether there are memory pages that are likely to be used by at least one I/O device attached to the servicing IOMMU. As mentioned earlier, memory pages that are likely to be used by an I/O device include memory pages in which an I/O device has previously expressed an interest. These memory pages include pages whose addresses are in PPR log files, error log files (i.e., invalid PPR requests, I/O page fault event log files etc.). The pages that are likely to be used by an I/O device also include pages whose addresses are obtained from device specific monitoring and performance counter monitoring, from address translation hint commands, from ill-formed PCIe page requests, from prefetch IOMMU pages, as well as from invalidate IOTLB page commands.

If there are not any memory pages that are likely to be used by an I/O device, the scheduler waits at box 402. If, on the other hand, there is one or more memory pages that are likely to be used by an I/O device, at box 404, the scheduler obtains the address of the page if there is only one page or the address of the first page if there is more than one page. Upon obtaining the address of the page or of the first page, the scheduler determines at decision box 406 whether the page is to be migrated. As explained earlier, pages that are to be migrated are pages that are in a memory system in a different NUMA node than a servicing IOMMU to which the I/O device is attached. The radix table in the TLB associated with the servicing IOMMU may be used to determine whether the data or file is loaded in memory pages that are in a memory system in a different NUMA node than the IOMMU to which the I/O device is attached.

However and as previously explained, although a page may be in a different NUMA node than the servicing IOMMU, if the page is in a region in system memory reserved for memory-based queues for exchanging commands and status information between an IOMMU and an APU, the page may not be migrated. Further, pages that are used by both an IOMMU and an MMU may not be moved and neither are pages that contain event log files.

If the page is not to be moved, the process jumps to box 412. If the page can be moved, at box 410 the scheduler schedules the page for migration and at decision box 412 checks to see whether there are other pages to schedule for migration. If so, the scheduler obtains the address of the next page at box 414 and the process returns to box 406. If there are not anymore pages that are to be scheduled for migration, the process returns to box 402. The process ends when the server 100 is turned off or is rebooted.

Some or all of the software components may be stored in a non-transitory computer readable storage medium for execution by at least one processor. In various embodiments, the non-transitory computer readable storage medium includes a magnetic or optical disk storage device, solid-state storage devices such as FLASH memory, or other non-volatile memory device or devices. The computer readable instructions stored on the non-transitory computer readable storage medium may be in source code, assembly language code, object code, or other instruction format that is interpreted and/or executable by one or more processors.

The circuits of FIGS. 1-3 or portions thereof may be described or represented by a computer accessible data structure in the form of a database or other data structure which can be read by a program and used, directly or indirectly, to fabricate integrated circuits with the circuits of FIGS. 1-3. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates that also represent the functionality of the hardware comprising integrated circuits with the circuits of FIGS. 1-3. The netlist may then be placed and routed to produce a data set describing geometric shapes to be applied to masks. The masks may then be used in various semiconductor fabrication steps to produce integrated circuits of FIGS. 1-3. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, although schedulers 146 and 166 are shown as being part of IOMMUs 142 and 162, respectively, they need not be. Schedulers 146 and 166 may be part of the OS running on server 100, or part of a hypervisor etc. Further, the process running in schedulers 146 and 166 may be implemented in hardware, software or firmware. Thus, the depiction of schedulers 146 and 166 in IOMMUs 142 and 162 is for illustration purposes only.

Accordingly, it is intended by the appended claims to cover all modifications of the disclosed embodiments that fall within the scope of the disclosed embodiments.

What is claimed is:

1. A method of scheduling data migration comprising:
   determining whether the data is likely to be used by an input/output (I/O) device, the data being at a location remote to the I/O device; and
   scheduling the data for migration from the remote location to a location local to the I/O device in response to determining that the data is likely to be used by the I/O device, wherein determining that the data is likely to be used by the I/O device comprises monitoring an event associated with translating addresses by a memory management unit local to the I/O device,
   wherein monitoring the event associated with translating addresses by the memory management unit local to the I/O device includes one or more of: monitoring data having a memory address in a peripheral page service request event log file, monitoring data having a memory address in an error event log file, and monitoring data having a memory address in a command issued by the I/O device to invalidate the data.

2. The method of claim 1, wherein scheduling the data for migration includes:
   determining, in response to determining that the data is likely to be used by the I/O device, whether the data is to be migrated; and
   scheduling the data for migration in response to determining that the data is to be migrated.

3. The method of claim 2, wherein data that is to be migrated includes data that is not being used by a remote device at the remote location.

4. The method of claim 3, wherein the remote device includes a memory management unit (MMU).

5. The method of claim 1, wherein data that is likely to be used by the I/O device includes data in which the I/O device has previously expressed an interest.

6. The method of claim 5, wherein data in which the I/O device has previously expressed an interest includes data having a memory address in a command issued by the I/O device to pre-fetch the data.

7. A data processing node comprising:
   a data processor; and
   an input/output memory management unit (IOMMU) coupled to the data processor and adapted to associate logical memory pages to corresponding physical pages wherein each physical page may be located in either a local memory device associated with the data processing node or in a remote memory device associated with another processing node, wherein the IOMMU is adapted to determine whether data in a physical page in the remote memory device is likely to be used by an input/output (I/O) device coupled to and associated with the processing node, and in response to determining that the data is likely to be used by the I/O device, to schedule migration of the data in the physical page at the remote memory device to a physical page at the local memory device, wherein the IOMMU determines that data is likely to be used by the I/O device by monitoring the output of at least one address translation circuit associated with the I/O device, and wherein the IOMMU monitors the output of the at least one address translation circuit associated with the I/O device by monitoring a memory address in a log file.

8. The data processing node of claim 7, wherein the IOMMU is further adapted to determine, in response to determining that the data is likely to be used by the I/O device, whether the data can be migrated, and to schedule migration of the data in the physical page at the remote memory device to the physical page at the local memory device in response to determining that the data can be migrated.

9. The data processing node of claim 8, wherein data that can be migrated includes data that is not being used by a remote device at a remote location.

10. The data processing node of claim 8, wherein the remote device includes a memory management unit (MMU).

11. The data processing node of claim 8, wherein data likely to be used by the I/O device includes data having a memory address in a command issued by the I/O device to pre-fetch the data.

12. The data processing node of claim 8, wherein the IOMMU monitors the output of the at least one address translation circuit associated with the I/O device by monitoring a memory address in a peripheral page service request event log file.

13. The data processing node of claim 8, wherein the IOMMU monitors the output of the at least one address translation circuit associated with the I/O device by monitoring a memory address in an error event log file.

14. A data processing node comprising:
a data processor; and
an input/output memory management unit (IOMMU) coupled to the data processor and adapted to associate logical memory pages to corresponding physical pages wherein each physical page may be located in either a local memory device associated with the data processing node or in a remote memory device associated with another processing node, wherein the IOMMU is adapted to determine whether data in a physical page in the remote memory device is likely to be used by an input/output (I/O) device coupled to and associated with the processing node, and in response to determining that the data is likely to be used by the I/O device, to schedule migration of the data in the physical page at the remote memory device to a physical page at the local memory device, wherein the IOMMU determines that data is likely to be used by the I/O device by monitoring the output of at least one address translation circuit associated with the I/O device, and wherein the IOMMU monitors the output of the at least one address translation circuit associated with the I/O device by monitoring a memory address in a command issued by the I/O device to invalidate the data.

\* \* \* \* \*